Patented Apr. 7, 1942

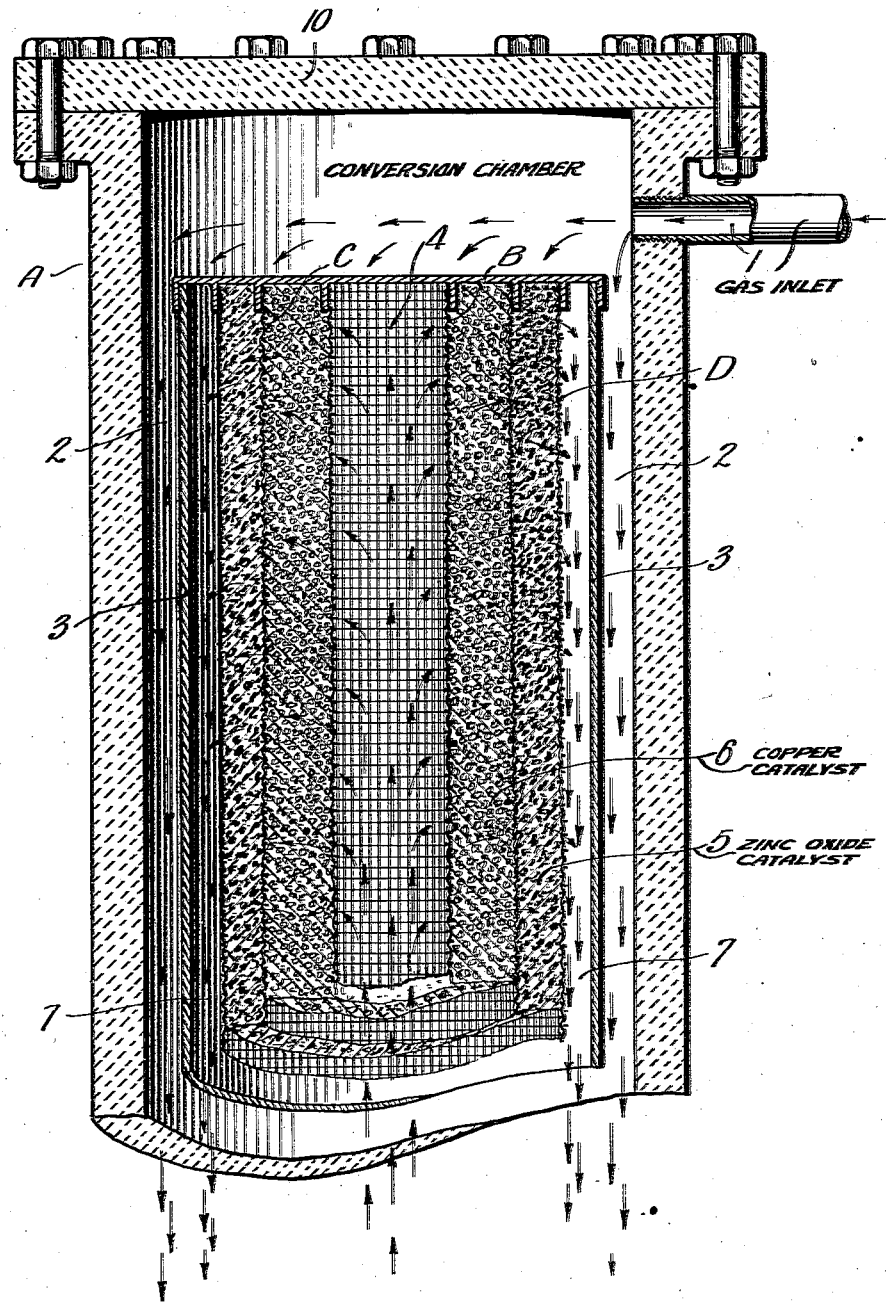

2,279,153

UNITED STATES PATENT OFFICE 2,279,153

PROCESS OF OBTAINING METHANOL

William D. Wilcox, Kansas City, Mo.; Mary Palmer Wilcox, executrix of said William D. Wilcox, deceased, assignor to Le Roy J. Snyder, Kansas City, Mo., James V. Richards, Pekin, Ill., and Henry Mills Wilcox, Santa Monica, Calif., as trustees Application May 19, 1938, Serial No. 208,840

11 Claims. (Cl. 260—449)

From the first employment of the procedure by which synthetic methanol has been produced, zinc oxide and finely divided metallic copper have been found to be the most effective catalysts for accelerating the union of carbon monoxide and hydrogen to form methanol according to the reaction CO plus $2H_2$ equals $CH_3OH$. While there are many patents in which the use of other catalysts is proposed, many of these will be found to possess little value for the purpose indicated. Zinc oxide, or preferably zinc oxide to which has been added a less proportion of chromium oxide, has the merit of retaining its efficiency in promoting synthesis over a long period of time and of resisting an impairment of efficiency at relatively high temperatures of operation. It is less active than finely divided metallic copper, but this latter, while initially very active, is found to lose its effectiveness very rapidly as ordinarily employed. This loss of activity may result from several causes: from a poisoning of the catalyst by reason of sulphur compounds in the gas; by "fouling" through the deposit upon the catalyst of a film of hydrocarbons which are not vaporous at the temperature of operation, derived either through the polymerization of hydrocarbons in the gas or which may have been formed by side reactions during the synthesis, and by a change in the structure of the catalyst which may be a crystalization or a sort of sintering at temperatures much below the melting point of the copper by which the very minute molecular protusions which are the center of catalytic activity are leveled off. Loss of efficiency through poisoning may be reduced by a thorough removal of sulphur compounds from the gas, prior to its use. Fouling may be retarded by a prior complete dissociation of the hydrocarbons in the gas mixture and operation at a relatively low temperature at which the formation of hydrocarbons by side reactions is reduced, and the further polymerization to a non-vaporous form will not take place. The sintering or crystalization of the copper will be retarded by operation at a relatively low temperature between the range 200° to 300° C. But the rate of synthesis rises with a rise in temperature of the gas up to 350° to 400° C., and may be carried out effectively employing a zinc oxide-chromium catalyst at a temperature up to 450° C.

The control of the temperature is rendered difficult by the fact that the reaction by which methanol is formed is highly exothermic. Around 18% of the heat value of the gas synthesized is in the reaction forming methanol evolved as sensible heat. The dissipation of this heat from the catalyst to the enclosing walls is unavoidably quite small, and would be undesirable as it would, by overheating the walls, reduce their strength and resistance to the high pressure of operation. No matter how active the catalyst employed, it is not practicable to effect a complete conversion in one passage of the gas through the body of catalyst. If this were to take place, assuming the gas to be at 200° C., where brought in contact with the catalyst (about the lowest temperature at which the reaction will take place at a practicable rate), there will be evolved sufficient heat to raise the temperature of the gas to well over 1500° C. If one-sixth only of the gas has reacted, the rise in temperature from the initial temperature of 200° C. will, disregarding the very small loss by the dissemination of heat to the enclosing walls, will be 219° C. and the final temperature over 400° C.

It is clearly apparent that the more rapid the formation of methanol by reason of greater activity of the catalyst employed, the greater will be the output of the synthesis chamber in unit time—provided that an excessive rise in the temperature be prevented by limiting the proportion of the gas synthesized per pass. This may be done by increasing the velocity of passage through the body of catalyst.

A conversion of from 15 to 16⅔% may be effected without an undesired rise in temperature and the rate of throughput so adjusted to the activity of the catalyst as to prevent any greater conversion. But operation with a final temperature in excess of 400° C. while entirely feasible using a zinc oxide-chromium catalyst, will very quickly impair the efficiency of a copper catalyst. Using a zinc oxide catalyst only, the rate of throughput to secure a 15% conversion will be relatively slow and the total product of methanol recovered per unit time of operation, correspondingly reduced.

The gist of my invention is the passage of the carbon monoxide-hydrogen mixture first through a layer of finely divided copper or, preferably of finely divided copper to which there may be added a very small percent of aluminum or cerium oxide which acts as promoters of activity and preferably a proportion of zinc oxide equal to 20% or more of the copper which, if intimately mixed with it, will not only assist in the catalysis but will operate to retard the crystallization of the copper. The initial temperature of the gas will be within the range 200-250° C., and the thickness of the layer of copper and the time of contact of the gas with the copper such that the heat evolved will not bring the temperature to more than 300 or 325° C., at which fouling or a sintering of the copper might take place.

Since the gas is moving forward through the catalyst, heat does not pass back. The gas will then be passed through a layer of zinc oxide catalyst at approximately 300° C. and, with the further formation of methanol, there will take place an additional evolution of heat as brings the exit temperature of the gas to 400° C. or to something above this, where the initial temperature of admission was over 200° C. The resistance of the zinc oxide catalyst to loss of activity at the temperature of operation proposed, may be increased by an intimate mixture with it of a less proportion of chromium oxide.

There is a considerable range of choice in the placing of the copper and zinc oxide layers in relation to each other, within the catalyst chamber without losing the benefit of my proposal, but I prefer to employ the arrangement disclosed in the accompanying drawing.

In this drawing, A is the upper part of a conversion chamber in which synthesis is effected. B, C, and D identify the upper portion of three concentric cylinders, preferably of copper gauze, permeable but having a mesh of such fineness as to retain the finely divided catalysts, rendered rigid by copper or copper plated rods extending from top to bottom, with a removable cover at top and a permanent closure of their lower extremities.

I is the inlet of the gas to be synthesized. The gas passes down through 2—2, between the interior walls of the conversion chamber A and 3, a cylinder of copper or of steel heavily copper plated. It passes through a heat exchanger, not shown, in the lower part of the conversion chamber, and is brought by the heat absorbed from the outlet gas to a temperature of 200 to 250° C., at which it enters the space 4, enclosed by cylinder B.

It passes through a layer of catalyst composed chiefly of finely divided metallic copper 6—6, enclosed in the space between cylinders B and C, thence through a layer of catalyst chiefly zinc oxide 5—5, enclosed between cylinders C and D. It then passes down the space 7—7, between cylinder D and enclosing cylinder 3, to the heat exchanger, and is withdrawn from an outlet in the lower part of the conversion chamber, not shown.

The cylinders B, C and D are so constructed that they may readily be removed from the conversion chamber through the lid 10, and as readily replaced. This may be found of material advantage in operation. When it becomes necessary to replace the catalyst, the cylinders may be withdrawn and similar cylinders containing fresh catalyst put in their place. The catalyst in the cylinders, thus introduced, will have been preheated by extraneous means to a temperature within the range 200–300° C., and the production of methanol resumed with little delay, due to the necessity of bringing the interior temperature of the conversion chamber to that required for an active conversion.

This added utility may make the use of cylinders such as shown, of advantage in the synthesis of ammonia where a different catalyst is used and no advantage accrues through the use of two different catalysts.

There is a further advantage realized through the use of concentric cylinders as containers of the catalyst, the permeable walls of which are in parallel with the walls of the conversion chamber, an advantage which may be realized in the synthesis of ammonia as well as in the synthesis of methanol. The convertor is a tube of very substantial length relative to its diameter. A lid is provided at one extremity to give access to the interior. As the diameter of the lid is increased, the internal pressure of the gas upon the means by which the lid is held in place increases as the square of the diameter, while the circumference of the lid in which the retaining bolts are placed increases only as the diameter. The necessity of avoiding a pressure on the lid exceeding the resistance of the bolts, limits the size of the lid and hence the diameter of the conversion tube. To utilize the capacity of the tube, the gas being passed through the catalyst in a direction parallel with the walls of the tube, the catalyst may have a thickness of anywhere from four to six feet.

In order to avoid an impracticable differential in pressure, the catalyst must be in granules of a size which renders it permeable. Where employing two or more concentric cylinders, the gas is passed through the catalyst in a horizontal direction at right angles to the walls of the conversion chamber, either from the space enclosed by the inner cylinder outward or from a space surrounding the outer cylinder to the interior of the inner, the distance of travel of the gas through the catalyst is from 9 to 13 inches.

It is possible without the creation of an undesirable back pressure, to employ the catalyst in a much more finely divided state. If the average diameter of the granules be reduced one-half the area of surface per cubic foot of catalyst with which the gas is brought in contact is doubled and the rate of synthesis per cubic foot is substantially increased, the amount of conversion per pass may be kept constant by an increase in the rate of throughput, with a substantial increase in daily output of the product desired.

I disclose in my U. S. patents, Nos. 1,903,845 and 1,905,326, and in pending applications, procedures by which natural gas and hydrocarbon gases such as the cracking still gas given off in the high temperature treatment of petroleum oils of any known composition, may be completely dissociated so that there is present no material percentage of undecomposed hydrocarbon gas and a product obtained, composed of carbon monoxide and hydrogen, in the volumetric ratio of one and two. While this mixture is, generally speaking, the preferred material for synthesis, a mixture of carbon dioxide with three volumes of hydrogen may be employed. Some advantage has been found in operation with the hydrogen content of the gas considerably in excess relative to the carbon monoxide of the proportion at which they unite. But the composition of the make up gas must be very nearly in this proportion. Where a portion of the gas introduced is bled off to prevent an accumulation of inert gases, a small excess of hydrogen, from 10 to 20% above the 2:1 ratio in the make up gas, will maintain constant and established rate within the catalyst chamber of 4:1.

While my invention originated from a study of the characteristics in use of finely divided metallic copper and zinc oxide catalysts, it is apparent that similar gains may be obtained using in combination any catalyst which is active within the temperature range of 200° C. and 300° C., but which loses its activity when subjected to higher temperatures with a further conversion of the gases effected by a following passage of the gases through a catalyst found to be resistant to impairment of its activity at temperatures within the range 300° C. to 400° C. or higher. My invention is applicable to such catalysts and may be extended to cover a three catalyst combination, employed where higher alcohols are sought to be produced, in which the catalyst, third in the line of travel of the gas may contain an alkaline addition and with a slower rate of throughput and higher percentage of conversion per pass be subjected to temperatures within the range 400° C. to 600° C.

What I claim as new and desire to protect by the issuance to me of Letters Patent is:

1. In the process of obtaining methanol by the synthesis of oxides of carbon and hydrogen effected by their passage under a high pressure in contact with suitable catalysts, the improvement which consists in first passing these gases at temperatures within the range 200° C. to 325° C. through a layer of catalysts which is predominantly of finely divided metallic copper and then at a temperature within the range 300° C. to 450° C. through a layer of catalysts which is predominantly composed of zinc oxide.

2. In the process of obtaining methanol by the synthesis of oxides of carbon and hydrogen effected by their passage through a converter in contact with suitable catalysts; the steps of first passing these gases at temperatures within the range of 200° C. to 325° C. through a catalytic layer comprised of finely divided copper, plus a proportion of aluminum oxide equal to a very small percent of the copper, and a proportion of zinc oxide equal to approximately twenty percent of the copper; and then passing the gas at a temperature within the range of 300° C. to 450° C., through a catalytic layer comprised of zinc oxide.

3. In the process of obtaining methanol by the synthesis of oxides of carbon and hydrogen effected by their passage through a converter in contact with suitable catalysts; the steps of first passing these gases at temperatures within the range of 200° C. to 325° C. through a catalytic layer comprised of finely divided copper, plus a proportion of aluminum oxide equal to a very small percent of the copper; and then passing the gas, at a temperature within the range of 300° C. to 450° C., through a catalytic layer comprised of zinc oxide.

4. In the process of obtaining methanol by the synthesis of oxides of carbon and hydrogen effected by their passage through a converter in contact with suitable catalysts; the steps of first passing these gases at temperatures within the range of 200° C. to 325° C. through a catalytic layer comprised of finely divided copper, plus a proportion of zinc oxide equal to approximately twenty percent of the copper; and then passing the gas, at a temperature within the range 300° C. to 450° C., through a catalytic layer comprised of zinc oxide.

5. In the process of obtaining methanol by the synthesis of oxides of carbon and hydrogen effected by their passage through a converter in contact with suitable catalysts; the steps of first passing these gases at temperatures within the range 200° C. to 325° C. through a catalytic layer comprised of finely divided copper, plus a proportion of aluminum oxide equal to a very small percent of the copper, and a proportion of zinc oxide equal to approximately twenty percent of the copper; and then passing the gas, at a temperature within the range 300° C. to 450° C., through a catalytic layer comprised of a mixture of zinc oxide and chromium oxide, the chromium oxide being less in amount than the zinc oxide.

6. In the process of obtaining methanol by the synthesis of oxides of carbon and hydrogen effected by their passage through a converter in contact with suitable catalysts; the steps of first passing these gases at temperatures within the range of 200° C. to 325° C. through a catalytic layer comprised of finely divided copper, plus a proportion of aluminum oxide equal to a very small percent of the copper; and then passing the gas, at a temperature within the range of 300° C. to 450° C., through a catalytic layer comprised of a mixture of zinc oxide and chromium oxide, the chromium oxide being less in amount than the zinc oxide.

7. In the process of obtaining methanol by the synthesis of oxides of carbon and hydrogen effected by their passage through a converter in contact with suitable catalysts; the steps of first passing these gases at temperatures within the range of 200° C. to 325° C. through a catalytic layer comprised of finely divided copper, plus a proportion of zinc oxide equal to approximately twenty percent of the copper; and then passing the gas, at a temperature within the range 300° C. to 450° C., through a catalytic layer comprised of a mixture of zinc oxide and chromium oxide, the chromium oxide being less in amount than the zinc oxide.

8. In the process of obtaining methanol by the synethesis of oxides of carbon and hydrogen effected by their passage through a converter in contact with suitable catalysts; the steps of bringing these gases, at a temperature of 200° C. to 350° C., in contact with a catalytic layer which is predominantly of finely divided metallic copper; and then passing the gases, at a temperature of 300° C. to 450° C., through a layer of predominantly zinc oxide, the velocity of throughput being such that approximately one-sixth of the gas will be reduced to methanol.

9. In the process of obtaining methanol by the synthesis of oxides of carbon and hydrogen effected by their passage through a converter in contact with suitable catalysts; the steps of bringing these gases, at a temperature of 200° C. to 350° C., in contact with a catalytic layer which is predominantly of finely divided metallic copper; and then passing the gases through a layer of predominantly zinc oxide, the velocity of throughput being such that approximately one-sixth of the gas will be reduced to methanol.

10. In the proces of obtaining methanol by the synthesis of oxides of carbon and hydrogen effected by their passage through a converter in contact with suitable catalysts; the steps of bringing these gases, at a temperature of 200° C. to 350° C., in contact with a catalytic layer which is predominantly of finely divided metallic copper; and then passing the gases through a layer of predominantly zinc oxide, the gas remaining in contact with the catalysts until approximately sixteen and two-thirds per cent thereof has been converted to methanol.

11. The process of obtaining methanol by the synthesis of a gas mixture containing hydrogen and carbon monoxide, there being an excess of hydrogen in the amount of ten to twenty percent above the two to one ratio of hydrogen to carbon dioxide in the gas being treated; the passage of these gases at temperatures within the range of 200° C. to 325° C. through a layer of catalysts which is predominantly of finely divided metallic copper; and then passing the gas at a temperature within the range of 300° C. to 450° C. through a layer of catalysts which is predominantly composed of zinc oxide.

WILLIAM D. WILCOX.